(12) United States Patent  (10) Patent No.: US 8,426,099 B2
Nakajima et al.  (45) Date of Patent: Apr. 23, 2013

(54) COLORED RESIN PARTICLES, MANUFACTURING METHOD OF THE COLORED RESIN PARTICLES AND TONER FOR ELECTROSTATICALLY CHARGED IMAGE DEVELOPMENT

(75) Inventors: Tomohito Nakajima, Kanagawa (JP); Hiroyuki Moriya, Kanagawa (JP); Hideya Katsuhara, Kanagawa (JP); Seiichi Takagi, Kanagawa (JP); Kazuya Hongo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/478,730

(22) Filed: May 23, 2012

(65) Prior Publication Data

US 2012/0231391 A1  Sep. 13, 2012

Related U.S. Application Data

(62) Division of application No. 12/465,144, filed on May 13, 2009, now abandoned.

(30) Foreign Application Priority Data

Nov. 18, 2008  (JP) .................................. 2008-294693

(51) Int. Cl.
*G03G 9/08*  (2006.01)
(52) U.S. Cl.
USPC .................................. 430/137.1; 430/137.14
(58) Field of Classification Search ............... 430/137.1, 430/137.14
See application file for complete search history.

(56) References Cited

U.S. PATENT DOCUMENTS

| | | | |
|---|---|---|---|
| 5,912,101 A | 6/1999 | Karaki et al. | |
| 6,033,817 A | 3/2000 | Yusa et al. | |
| 6,346,356 B1 | 2/2002 | Ohno et al. | |
| 6,635,398 B1 | 10/2003 | Komoto et al. | |
| 7,452,654 B2 * | 11/2008 | Hirose et al. | 430/137.14 |
| 2001/0033983 A1 | 10/2001 | Ohno et al. | |
| 2003/0148204 A1 | 8/2003 | Ohmura et al. | |
| 2003/0186152 A1 | 10/2003 | Ohno et al. | |
| 2004/0191666 A1 | 9/2004 | Kamada et al. | |
| 2005/0100813 A1 | 5/2005 | Yamazaki et al. | |
| 2007/0259283 A1 | 11/2007 | Abe et al. | |
| 2008/0171282 A1 | 7/2008 | Urabe et al. | |

(Continued)

FOREIGN PATENT DOCUMENTS

JP  A-10-039537  2/1998
JP  A-10-097095  4/1998

(Continued)

OTHER PUBLICATIONS

Third Party Submission Information Statement issued in Patent Application No. 2008-294693; dated Jul. 25, 2011 (with Translation.).

*Primary Examiner* — Hoa V Le
(74) *Attorney, Agent, or Firm* — Oliff & Berridge, PLC

(57) ABSTRACT

Colored resin particles, each includes: a resin; and a colorant, wherein a value of average equivalent circle diameter A (μm) of the colored resin particles is $3 \leq A \leq 6$, an average degree of circularity B of the colored resin particles satisfies the following expression (1), and $$0.990 - 0.0083A \leq B \leq 1.021 - 0.0117A \quad (1)$$

a cumulative number frequency of particles which have degrees of circularity of less than 0.9 in the colored resin particles is 1% or less.

15 Claims, 2 Drawing Sheets

U.S. PATENT DOCUMENTS

| | | |
|---|---|---|
| 2008/0227014 A1 | 9/2008 | Mizuguchi et al. |
| 2009/0074467 A1 | 3/2009 | Seshita et al. |
| 2010/0052204 A1 | 3/2010 | Takagi et al. |

FOREIGN PATENT DOCUMENTS

| | | |
|---|---|---|
| JP | A-11-002922 | 1/1999 |
| JP | A-11-002923 | 1/1999 |
| JP | A-11-149174 | 6/1999 |
| JP | A-11-149176 | 6/1999 |
| JP | A-11-184151 | 7/1999 |
| JP | A-11-194539 | 7/1999 |
| JP | A-11-202557 | 7/1999 |
| JP | A-11-305477 | 11/1999 |
| JP | A-11-344829 | 12/1999 |
| JP | A-2000-258954 | 9/2000 |
| JP | A-2002-196532 | 7/2002 |
| JP | A-2002-278142 | 9/2002 |
| JP | A-2003-029459 | 1/2003 |
| JP | A-2003-098703 | 4/2003 |
| JP | A-2003-202684 | 7/2003 |
| JP | A-2003-241417 | 8/2003 |
| JP | A-2003-330223 | 11/2003 |
| JP | A-2004-271809 | 9/2004 |
| JP | A-2005-321838 | 11/2005 |
| JP | A-2005-331990 | 12/2005 |
| JP | A-2006-078610 | 3/2006 |
| JP | A-2007-323027 | 12/2007 |
| JP | A-2008-007612 | 1/2008 |
| JP | A-2008-225120 | 9/2008 |
| JP | A-2009-235389 | 10/2009 |

* cited by examiner

COLORED RESIN PARTICLES, MANUFACTURING METHOD OF THE COLORED RESIN PARTICLES AND TONER FOR ELECTROSTATICALLY CHARGED IMAGE DEVELOPMENT

CROSS-REFERENCE TO RELATED APPLICATIONS

This is a Division of application Ser. No. 12/465,144 filed May 13, 2009, which claims priority under 35 USC 119 from Japanese Patent Applications No. 2008-294693 filed Nov. 18, 2008.

BACKGROUND

1. Technical Field

The present invention relates to colored resin particles, a manufacturing method of the colored resin particles and a toner for electrostatically charged image development.

2. Related Art

Microelements or devices represented by micro-reactors generally defined as "devices produced utilizing micro-processes and used for reaction in micro-channels having an equivalent diameter of 500 μm or less" are recently expected to be applied to various fields, since various advantages, e.g., a small amount and many kinds can be dealt with, high efficiency and low environmental load, can be realized when used in techniques such as analysis, synthesis, extraction and separation of materials.

SUMMARY

According to an aspect of the invention, there is provided colored resin particles, each including: a resin; and a colorant, wherein a value of average equivalent circle diameter A (μm) of the colored resin particles is $3 \leq A \leq 6$, an average degree of circularity B of the colored resin particles satisfies the following expression (1), and $$0.990 - 0.0083A \leq B \leq 1.021 - 0.0117A \quad (1)$$

a cumulative number frequency of particles which have degrees of circularity of less than 0.9 in the colored resin particles is 1% or less.

BRIEF DESCRIPTION OF THE DRAWINGS

Exemplary embodiments of the present invention will be described in detail based on the following figures, wherein.

DETAILED DESCRIPTION

I. Colored Resin Particles

Figure 1:
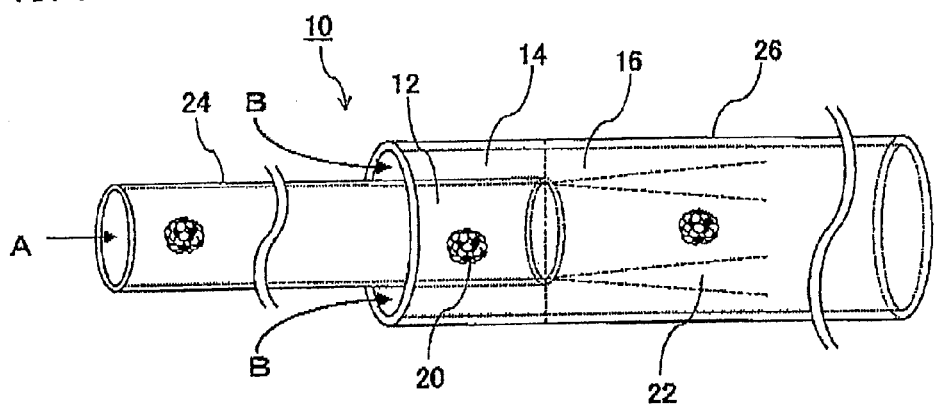
FIG. 1 is a typical drawing showing an exemplary example of a pipeline type reactor for use in the manufacturing method of the colored resin particles in the exemplary embodiment of the invention.

The colored resin particles of the invention are characteristic in that the value of average equivalent circle diameter A (μm) is $3 \leq A \leq 6$, an average degree of circularity B satisfies the following expression (1), and a cumulative number frequency of particles which have degrees of circularity of less than 0.9 in the colored resin particles is 1% or less, and each of the colored resin particles contains a resin and a colorant.

$$0.990 - 0.0083A \leq B \leq 1.021 - 0.0117A \quad (1)$$

These colored resin particles of the invention are of equal particle size and shape, and especially particles having distorted shapes that are often seen when particle sizes are big are hardly seen.

The colored resin particles of the invention are described in detail below.

Equivalent Circle Diameter:

The value of average equivalent circle diameter A (μm) of the colored resin particles of the invention is $3 \leq A \leq 6$. When average equivalent circle diameter A (μm) is less than 3, flowing ability and cleaning property as powder deteriorate and the particles are inferior in easiness of handling. Further, when average equivalent circle diameter A (μm) exceeds 6, reproducibility of fine line parts as image and uniformity in in-plane density of the image part deteriorate.

The average equivalent circle diameter here means the average value of circumferential equivalent circle diameters of colored resin particles. Circumferential equivalent circle diameter can be found by, for example, photographing a colored resin particle, performing image processing, and calculating the diameter of a complete circle having the circumference equivalent to the peripheral length of the particle of the colored resin particle image.

Average equivalent circle diameter A can be measured with, for example, a flow particle image analyzer FPIA-3000 (manufactured by Sysmex Corporation), and the like.

According to the analyzer, individual colored resin particle can be photographed by a CCD camera, and several thousands of particle images can be analyzed in a short time. In the invention, equivalent circle diameters of 3,000 particles of colored resin particles are computed and the average value thereof is taken as average equivalent circle diameter A.

Circularity:

In the colored resin particles in the invention, average degree of circularity B satisfies the relationship of expression (1).

$$0.990 - 0.0083A \leq B \leq 1.021 - 0.0117A \quad (1)$$

If average degree of circularity B is less than 0.990−0.0083A, when the colored resin particles are used as a toner for electrostatically charged image development, particles having distorted shapes are frequent particularly in a large particle size area, and melting and coalescing degree as toner particles is a little insufficient, so that such resin particles are inferior in view of the uniformity of shape and particle strength. While if average degree of circularity B exceeds 1.021−0.0117A, when the colored resin particles are used as a toner for electrostatically charged image development, since the particles are near to spherical, contact with a cleaning blade, a cleaning brush, etc., is not sufficient and removal is difficult, so that they are inferior particularly in a cleaning property.

Average degree of circularity B indicates an average value of degree of circularity (circumference of a circle equivalent to the area of a particle/circumference of a particle). Circumference of a circle equivalent to the area of a particle and circumference of a particle can be computed by, for example, photographing a colored resin particle and performing image processing.

Average degree of circularity B can be measured with, for example, a flow particle image analyzer FPIA-3000 (manufactured by Sysmex Corporation), and the like. In the invention, degree of circularity of 3,000 particles of colored resin particles are computed and the average value thereof is calculated and it is taken as average degree of circularity B.

In the colored resin particles of the invention, a cumulative number frequency of particles which have degrees of circularity of less than 0.9 is 1% or less. When a cumulative number frequency of particles which have degrees of circularity of less than 0.9 exceeds 1%, the distribution of degree of circularity expands and particles having distorted shapes are conspicuous, and so the uniformity of density in the image part is inferior. A cumulative number frequency of particles which have degrees of circularity of less than 0.9 is preferably 0.7% or less, and more preferably 0.5% or less.

The variation coefficient of the degree of circularity (standard deviation of the degree of circularity/average degree of circularity B) of the colored resin particles is preferably 0.016 or less, and more preferably 0.014 or less. When the variation coefficient is in the above range, uniform degree of circularity can be obtained, and a stable cleaning property and excellent image density uniformity can be compatible.

The variation coefficient of the degree of circularity of the colored resin particles can be measured with, for example, a flow particle image analyzer FPIA-3000 (manufactured by Sysmex Corporation), and the like. In the invention, degree of circularity of 3,000 particles of the colored resin particles are computed, the standard deviations and average value thereof are computed, and the variation coefficient of the degree of circularity is calculated.

The colored resin particles in the invention each contain a resin and a colorant. The resins and colorants that can be used in the invention are explained below.

Resin:

Resins constituting the colored resin particles are not especially restricted and, for example, thermoplastic resins can be preferably used.

The specific examples of thermoplastic resins include homopolymers and copolymers of styrenes (styrene-based resins), e.g., styrene, parachlorostyrene, α-methylstyrene, etc.; homopolymers and copolymers of esters having a vinyl group (acrylate-based resins and methacrylate-based resins, hereinafter they are also referred to as (meth)acrylate-based resins), e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, etc.; homopolymers and copolymers of vinylnitriles (vinylnitrile-based resins), e.g., acrylonitrile, methacrylonitrile, etc.; homopolymers and copolymers of vinyl ethers (vinyl ether-based resins), e.g., vinyl ethyl ether, vinyl isobutyl ether, etc.; homopolymers and copolymers of vinyl ketones (vinyl ketone-based resins), e.g., vinyl methyl ketone, vinyl ethyl ketone, vinyl isopropenyl ketone, etc.; homopolymers and copolymers of olefins (olefin-based resins), e.g., ethylene, propylene, butadiene, isoprene, etc.; non-vinyl condensed resins, e.g., epoxy resins, polyester resins, polyurethane resins, polyamide resins, cellulose resins, polyether resins, etc.; and graft polymers of these non-vinyl condensed resins and vinyl-based monomers. These resins may be used by one kind alone, or two or more kinds of resins may be used in combination.

Of these resins, it is preferred to contain polyester resins and various vinyl-based resins as resin particles. In the case of vinyl-based resins, it is more preferred to contain acrylate-based resins, and to contain styrene-butyl acrylate copolymers is still more preferred. In the case of vinyl-based resins, resin particle dispersion can be easily manufactured by emulsion polymerization or seed polymerization by using a surfactant, and so advantageous.

In the invention, a binder resin can also be manufactured by adding a crosslinking agent.

As the examples of crosslinking agents, for example, aromatic polyvinyl compounds, e.g., divinylbenzene, divinylnaphthalene, etc.; polyvinyl esters of aromatic polycarboxylic acids, e.g., divinyl phthalate, divinyl isophthalate, divinyl terephthalate, divinyl homophthalate, divinyl/trivinyl trimesate, divinyl naphthalene dicarboxylate, divinyl biphenylcarboxylate, etc.; divinyl esters of nitrogen-containing aromatic compounds, e.g., divinyl pyridinedicarboxylate; vinyl esters of unsaturated heterocyclic compound carboxylic acids, e.g., vinyl pyromucate, vinyl furancarboxylate, vinyl pyrrole-2-carboxylate, vinyl thiophenecarboxylate, etc.; (meth)acrylic esters of straight chain polyhydric alcohols, e.g., butanediol methacrylate, hexanediol acrylate, octanediol methacrylate, decanediol acrylate, dodecanediol methacrylate, etc.; methacrylic esters of branched substituted polyhydric alcohols, e.g., neopentylglycol dimethacrylate, 2-hydroxy-1,3-diacryloyloxypropane, etc.; polyethylene glycol di(meth)acrylate, polypropylene polyethylene glycol di(meth)acrylates; and polyvinyl esters of polycarboxylic acid, e.g., divinyl succinate, divinyl fumarate, vinyl/divinyl maleate, divinyl diglycolate, vinyl/divinyl itaconate, divinyl acetonedicarboxylate, divinyl glutarate, divinyl 3,3'-thiodipropionate, divinyl/trivinyl trans-aconitate, divinyl adipate, divinyl pimelate, divinyl suberate, divinyl azelate, divinyl sebacate, divinyl dodecanedioic acid, divinyl brassylate, etc., are exemplified.

In the invention, these crosslinking agents may be used by one kind alone, or in combination of two or more kinds. Of the above crosslinking agents, when colored resin particles are used as the materials of a toner for electrostatically charged image development, so as not to make the colored resin particles viscous more than necessarily in a coalescent state, it is preferred to use (meth)acrylic esters of straight chain polyhydric alcohols, e.g., butanediol methacrylate, hexanediol acrylate, octanediol methacrylate, decanediol acrylate, dodecanediol methacrylate, etc.; methacrylic esters of branched substituted polyhydric alcohols, e.g., neopentylglycol dimethacrylate, 2-hydroxy-1,3-diacryloyl-oxypropane, etc.; polyethylene glycol di(meth)acrylate, polypropylene polyethylene glycol di(meth)acrylates, etc., which are capable of restraining the precipitation of a releasing agent to the surface of the toner in cooling time.

The content of the crosslinking agents is preferably in the range of 0.05 wt % or more and 5 wt % or less of the total amount of polymerizable monomers used for forming the above resins, and more preferably in the range of 0.1 wt % or more and 1.0 wt % or less.

Of these resins, styrene resins, vinyl resins, and olefin resins can be manufactured by radical polymerization of the polymerizable monomers.

Radical polymerization initiators used here are not especially restricted and well-known ones can be used.

Further, known chain transfer agents can be used for the adjustment of the molecular weights of the resins, and, for example, thiols and carbon tetrabromide are exemplified.

The chain transfer agents are not particularly limited and well-known ones can be used.

The polyester resins are not especially restricted, and they can be preferably synthesized with known polycarboxylic acids, polyols or derivatives thereof. Of these, polyester resins synthesized with known dicarboxylic acids and known diols as the main components are more preferred.

The polyester resins may be crystalline or amorphous. Further, these polyester resins may be used in combination of two or more kinds.

It is preferred to use a polycondensation catalyst in the synthesis of polycondensation resins such as polyester resins. As the polycondensation catalysts, known catalysts can be used.

When these resins are used as the materials of a toner for electrostatically charged image development, the weight average molecular weight Mw of the resins is preferably 5,000 to 45,000. When the resin is a polyester resin, Mw is preferably 5,000 to 30,000, and in the case of a vinyl resin, Mw is preferably in the range of 20,000 to 40,000.

When the weight average molecular weight is 45,000 or less, good solubility can be realized at fixing time, and an image excellent in transmittance can be obtained. Further, when the weight average molecular weight is 5,000 or more, the melting viscosity of the toner in a fixing process is good and excellent in cohesive force, so that generation of hot offset can be restrained.

Further, when the resin is a polyester resin, if the weight average molecular weight is 30,000 or less, dispersion in an aqueous medium is excellent.

Colorant:

The colorants that can be used in the invention are not especially restricted and well-known colorants are sufficient. The examples of the colorants include various kinds of pigments, e.g., Chrome Yellow, Hansa Yellow, Benzidine Yellow, Indanthrene Yellow, Quinoline Yellow, Permanent Orange GTR, Pyrazolone Orange, Vulcan Orange, Watchung Red, Permanent Red, Brilliant Carmine 3B, Brilliant Carmine 6B, Dupont Oil Red, Pyrazolone Red, Lithol Red, Rhodamine B Lake, Lake Red C, Rose Bengal, Aniline Blue, Ultramarine Blue, Chalco Oil Blue, Methylene Blue Chloride, Phthalocyanine Blue, Phthalocyanine Green, and Malachite Green Oxalate; and various kinds of dyes, e.g., acridine-based, xanthene-based, azo-based, benzoquinone-based, azine-based, anthraquinone-based, dioxazine-based, thiazine-based, azomethine-based, indigo-based, thioindigo-based, phthalocyanine-based, polymethine-based, triphenylmethane-based, diphenylmethane-based, thiazole-based, and xanthene-based dyes. These colorants may be used by one kind alone, or two or more kinds may be used in combination.

The content of the colorants is preferably 30 wt. % or less based on all the amount of the colored resin particles, and more preferably 2 to 20 wt %. When the content of the colorants is in the above range, coloring power and light transmission as fine particles are stable and so preferred.

The volume average particle size of colorant particles is preferably 1 µm or less, more preferably 0.5 µm or less, and still more preferably 0.01 to 0.5 µm. By adjusting the volume average particle size of colorant particles to the above range, the colorant can be homogeneously dispersed in coagulated particles. In the case of manufacturing a toner for electrostatically charged image development, when the volume average particle size of colorant particles is in the above range, uneven distribution of the composition among toner particles can be restrained and unevenness of performance and reliability of the toner can be controlled low, and so advantageous.

Further, by bringing the volume average particle size to 0.5 µm or less, when the colorant is used in a toner for electrostatically charged image development, the color developing property of the toner and color reproducibility can further be improved, and so preferred.

When colored resin particles are used as a toner for electrostatically charged image development, it is preferred to contain a releasing agent and additives in addition to a resin and a colorant.

Releasing Agent:

Releasing agents that can be used in the invention are preferably those poor in compatibility with resin particles (incompatible). Releasing agents low in compatibility with resin particles do not melt into the resin particles, so that they do not accelerate plasticization of the resin particles. Accordingly, when the releasing agents are used in a toner for electrostatically charged image development, they do not lower the viscosity of the toner at high temperature fixing time, and do not cause generation of offset.

The specific examples of releasing agents include low molecular weight polyolefins, e.g., polyethylene, polypropylene, polybutene, etc.; silicones showing softening temperature by heating; fatty acid amides, e.g., oleic acid amide, erucic acid amide, ricinoleic acid amide, and stearic acid amide; vegetable waxes, e.g., carnauba wax, rice wax, candelilla wax, Japan wax, and jojoba oil; animal waxes, e.g., bees wax; mineral and petroleum waxes, e.g., montan wax, ozocerite, ceresine, paraffin wax, microcrystalline wax, and Fisher-Tropsch wax; ester waxes of higher fatty acid and higher alcohol, e.g., stearyl stearate, and behenyl behenate; ester waxes of higher fatty acid and monovalent or polyvalent lower alcohol, e.g., butyl stearate, propyl oleate, monostearic acid glyceride, distearic acid glyceride, and pentaerythritol tetrabehenate; ester waxes comprising higher fatty acid and polyhydric alcohol polymer, e.g., diethylene glycol monostearate, dipropylene glycol distearate, diglyceride distearate, and triglyceride tetrastearate; sorbitan higher fatty acid ester waxes, e.g., sorbitan monostearate; and cholesterol higher fatty acid ester waxes, e.g., cholesteryl stearate.

When a toner for electrostatically charged image development is manufactured, the amount of a releasing agent in coagulated resin particles is preferably in the range of 5 to 20 wt % based on all the amount of the coagulated resin particles, and more preferably in the range of 7 to 15 wt %. The amount of a releasing agent of 5 wt % or more is sufficient as the absolute amount of the releasing agent, and when the releasing agent of this amount is used in a toner for electrostatically charged image development, generation of what is called document offset of transfer of a fixed image to the counter paper or image due to heat and pressure can be restrained. Further, when the amount of the releasing agent is 20 wt. % or less, when used in a toner for electrostatically charged image development, elasticity of the toner required in fixing is good and generation of hot offset can be restrained. Further, even when an image is formed on a non-absorbent substrate, adhesion of a releasing agent to the fixing roll can be controlled, and occurrence of wax offset, which is a phenomenon such that the traces of the releasing agent remain on the surface of the non-absorbent substrate on and after the second rotation, can be restrained.

The volume average particle size of releasing agent particles is preferably 1.0 µm or less, and more preferably 0.1 to 0.6 µm. When the volume average particle size is 1.0 µm or less, free particles are difficult to occur, and when the releasing agent particles are used in a toner for electrostatically charged image development, the domain diameter of the releasing agent in the finally obtained toner for electrostatically charged image development is preferred, and performance and reliability of the toner are improved.

Additives:

Various additives may be added to the colored resin particles of the invention, if necessary. For example, when the colored resin particles are used in the manufacture of a toner for electrostatically charged image development, known inner additives, static controllers, inorganic particles, organic particles, lubricants, and abrasives can be added.

II. Manufacturing Method of Colored Resin Particles

A manufacturing method of the colored resin particles of the invention comprises a process of preparing a reactor having a first confluent channel where a first channel and a second channel converge, and a temperature control unit of the first confluent channel, a process of feeding coagulated particle dispersion containing coagulated particles comprising at least resin particles and a colorant to the first channel, a process of stopping the growth of coagulation of the coagulated particles by feeding a liquid containing a coagulation stopper from the second channel, and a process of coalescing the coagulated particles by heating the first confluent channel.

In the manufacture of colored resin particles by a batch system as disclosed in JP-A-11-2922 and JP-A-11-2923, there are theoretically limits in particle size distribution control and coalescence form control by stirring and blending in a reaction tank. For example, in JP-A-11-2922 and JP-A-11-2923, toners are manufactured by using fine particle dispersion of the constituting material, chemically coagulating the fine particle dispersion of constituting material in a granulating process, and after that melting and coalescing coagulated particles one by one. In the coagulating process of performing granulation, coagulation of fine particles is controlled with physical force by stirring and blending in addition to the chemical coagulation.

In the stop of coagulation operation, operation to hinder particle size growth is carried out. At this time, if the stopping operation is not finished in an extremely short time, an area where particle growth does not cease and an area where growth hindrance operation goes too far are unevenly distributed, as a result the particle size dispersion occurs (fine particles, coarse particles). For example, in the case where manufacture is performed in a reaction tank with a stirring blade, particle growth is controlled by stirring force in many cases, so that the operation requiring instantaneity such as coagulation stopping is generally disadvantageous.

Further, after coagulation stopping, fine particles are merely adhering to each other by means of subtle force of a coagulant, and a little stirring force and reduction of cohesive force are liable to result in dissociation and disassembling (disconnection) of fine particles. So as not to cause such dissociation and disconnection, it is preferred to rapidly melt and coalesce the inside and outside of the coagulated particles. Preferably, melting and coalescing are realized by fusion of fine particles to each other by heating on the condition so that coagulated particles are not brought into contact to each other. However, the case of using a batch system reaction tank as above is disadvantageous in the points of rapid achievement of particle coalescence and time efficiency from the restriction of efficiency of heat transfer.

As described above, in the operations of coagulation stopping and fusion and coalescence, it becomes important to change conditional atmosphere without applying stirring force and shearing force within a short time to achieve narrow particle size distribution and shape uniformity.

Therefore, in the invention, channels are constituted such that coagulated particles whose particle sizes achieved the objective are introduced into a reactor, preferably a pipeline type reactor, and a coagulation stopper is flowed thereto to expedite coagulation stopping operation in an extremely short time. After stopping the coagulation of particles, fusion and coalescence of the inside and surface of the coagulated particles are accelerated by controlling the atmospheric temperature in a short time and highly accurately by the temperature controlling unit equipped in the pipeline route. At this time, a channel to introduce a shape controlling agent may be provided besides the temperature controlling unit. By feeding coagulated particles together with the media in the pipeline, it becomes possible to control coagulation stopping operation and coalescence operation continuously in high speed and highly efficiently.

Furthermore, for stopping the growth of the coagulated particles, it is important to avoid application of external force to the particles by stirring and shearing to the utmost for the purpose of maintaining the coagulation state in addition to the exposure of the particles to the atmosphere of the stopper in a very short time. In usual batch systems, since stirring and blending force is necessary for the diffusion of coagulation stoppers, locally uneven concentration occur, which no little affect the surface structure of the particles and particle distribution (increment of fine particles due to disconnection).

However, in a pipeline type reactor especially capable of easily maintaining a laminar flow state, a special stirring operation is not necessary for the diffusion of a coagulation stopper, and the particles can be rapidly exposed to the atmosphere of the coagulation stopper without applying stresses on the surfaces of particles.

Further, this is also the same in connection with the shape controlling agent at the time of fusion and coalescence. Unlike batch system reaction tanks, if there is no unevenness in the concentration of a shape controlling agent and it is possible to swiftly function on the surface of each particle, controlling to the particles of more homogeneous and even shapes is possible. Further, if a series of operations can be continuously done, productivity can be improved.

The exemplary embodiments of the invention will be described in further detail with reference to the figures.

Reactor:

A reactor that can be used in the manufacture of colored resin particles of the invention has a first confluent channel where a first channel and a second channel converge, and a temperature control unit of the confluent channel.

The reactor that can be used in the invention is an apparatus having a plurality of channels, preferably channels of a width of several µm to several ten mm.

Of the channels, channels of a microscale are sometimes called microchannels, and there are cases where reactors containing such microchannels are generically called micro-reactors.

A micro-reactor is not the one that makes turbulent flow as the field of reaction as conventional reactors, but makes laminar flow as the field of reaction. In laminar flow dominance, when two or more kinds of different liquids constitute laminar flows, in the interfacial areas of laminar flows comprising two or more kinds of different liquids, diffusion occurs by concentration difference of the materials in the liquids. As a result, migrations of the materials according to concentration difference occur. Further, the greater the molecular weight, the slower is the diffusion speed of the molecule. When laminar flow is taken as the field of reaction, in the case of mixing two kinds of liquids, the two kinds of liquids can be mixed by mutual diffusion in the interfacial area of two liquids. In the space of a microscale, a relative interfacial area is large and advantageous to perform diffusion mixing at such an interface.

When the channel of the reactor is a microscale, preferably when the channel is from several µm to 7,000 µm, both dimension and flow rate are small, and Reynold's number is 2,300 or less. Accordingly, a reactor having a channel of microscale is not turbulent flow dominance such as ordinary reactor but a reactor of laminar flow dominance.

Reynold's number (Re) is defined by the following expression:

$$Re=uL/v$$

wherein u is a flow rate, L is a representative length, and v is a coefficient of kinematic viscosity.

When Reynold's number (Re) is about 2,300 or less, the reaction becomes laminar flow dominance.

In the embodiment of the invention, the channel diameter of a reactor (the diameter or long side of the channel) is preferably 15 mm or less at the part of confluent channel. When the channel diameter is in the above range, the inside and outside of coagulated particles can be efficiently subjected to fusion and coalescence.

When the channel diameter (the diameter or long side of the channel) is 6,000 μm or less at the part of confluent channel, the confluent liquid forms a laminar flow, and the laminar flow can diffuse a coagulation stopper in a moment. A preferred channel diameter to form a laminar flow is preferably in the range of 10 to 1,000 μm, and more preferably 30 to 600 μm.

The diameter of a channel in the case where the cross section of a channel is not a circle, square, or rectangle, an equivalent circle diameter (a diameter) obtained from the cross sectional area perpendicularly cut in the flowing direction is taken as the diameter of a channel.

Although the length of confluent channel depends upon the concentration of the coagulation stopper, the temperature of the coagulation stopper, and heating condition in fusion and coalescence, the length is preferably in the range of 5 mm to 10 m, and more preferably 10 mm to 5 m. When the length is in the above range, coagulation stopping sufficiently terminates, the coagulated particles are hardly brought into contact with the inner channel wall of the channel, so that contamination of the channels due to adhesion of the coagulated particles can be prevented.

Further, the shapes of channels are not especially restricted and desired shapes can be taken, for example, the cross sectional shape obtained by perpendicularly cut in the flowing direction may be circular, elliptical or polygonal (including rectangular), a doughnut shape, or a shape like a snowman. In the invention, a pipeline type reactor of multiple pipe structure is preferably used and the cross section of the channel is preferably circular or elliptical.

In the reactor that can be used in the invention, the first channel, second channel and first confluent channel may be joined by arbitrary arrangement, but the arrangement is preferably such that the first channel and the second channel can be converged by forming a laminar flow at the confluent channel.

The reactors that can be preferably used in the invention are specifically a reactor of arranging the first channel inside of the second channel in a state of concentric circle (multiple pipe structure), and a reactor of arranging the first channel and the second channel in a Y-shape. A reactor of a multiple pipe structure is preferably used in the embodiment of the invention.

The micro-reactor that can be used in the invention may have channels other than the first channel, the second channel, and the first confluent channel. Other channels may be converged to the first channel, the second channel or the first confluent channel at arbitrary position.

As other channels, a manufacturing method of colored resin particles further having the second confluent channel where the first confluent channel and the third channel converge, and a process of feeding a liquid containing a shape controlling agent from the third channel, and a process of heating the second confluent channel can be preferably exemplified in the embodiment of the invention.

Further, a reactor having the arrangement of other channel so as to form a sheath flow capable of reducing the maleficent wall effect in the microchannel is also preferably exemplified.

When the width of a channel is narrow, attenuation of flow due to the wall of channel easily occurs. Further, there is a case where the colored resin particles in a melting state impinge upon the channel wall and it is difficult to maintain the shape uniformity. In such a case, maleficent wall effect and impinging of the inner wall and the resin particles can be relaxed by enclosing the resin particle dispersion with a buffer called a sheath liquid and running the sheath liquid into the microchannel to form a sheath flow between the inner wall of the channel and the resin particle dispersion.

It is also possible to control the atmosphere after running of the sheath liquid to a desired temperature in a moment by adjusting in advance the temperature of the sheath liquid before running.

In the reactor for use in the embodiment of the invention, it is preferred that the first liquid is fed without being brought into contact with the inner wall of the confluent channel.

For example, an embodiment such that the coagulated particle dispersion fed from the first channel and the liquid fed from the second channel and/or the third channel form a concentric circle flow with the coagulated particle dispersion as the center can be preferably exemplified.

As reactors forming the concentric circle, as shown in FIG. 1, reactor 10 in which first channel-forming member 24 is arranged inside of second channel-forming member 26 in a state of concentric circle (multiple pipe structure) can be preferably exemplified. In the above case also, coagulated particle dispersion A diffuses into other liquid containing liquid B containing a coagulation stopper, and finally they may be brought into contact with the inner wall of the confluent channel on the lower course of the stream. By feeding coagulated particle dispersion A without being in contact with the inner wall of the confluent channel, adhesion of coagulated resin particles and the like to the inner wall of the confluent channel can be prevented, so that clogging of the channel and generation of coarse particles can be restrained. In the embodiment of the invention, the coarse particle means a component having a large particle size among particles having particle size distribution, that is, it means especially a particle having a particle size of 2.5 times or more the volume average particle size of the particle. Further, reactors that can be used in the embodiment of the invention are preferably those whose inner wall of the first channel and the inner wall of the confluent channel are not continuously formed.

In the case where reactors that can be used in the embodiment of the invention are pipeline type reactors having a multiple pipe structure, it is preferred that the peripheral channel diameter of the confluent channel is larger than the channel diameter of the first channel.

In the embodiment of the invention, when the reactor is a pipeline type reactor, the ratio of the quantity of flow of the liquid fed to the first channel and the quantity of flow of the liquid fed to the second channel is preferably 1/0.3 to 1/100, and more preferably 1/0.5 to 1/20. When the ratio is in the above range, colored resin particles can be stably formed. Further, by bringing the quantity of flow of the liquid fed to the second channel into the above range, friction, contamination and clogging in the first confluent channel attributable to colored resin particles can be prevented.

Equally in the case of forming a third channel, the ratio of the quantity of flow of the liquid fed to the first channel and the quantity of flow of the liquid fed to the third channel is preferably 1/0.3 to 1/100, and more preferably 1/0.5 to 1/20.

Reactors for use in the embodiment of the invention have a temperature control unit of the confluent channel. As the temperature control unit, temperature conditioners such as a heating system and a cooling system are exemplified. Metallic resistance and polysilicon can be preferably used as the heating system. The temperature conditioner can be built in a reactor, or a reactor may be entirely put in a temperature-controlled container for temperature control.

In the embodiment of the invention, by heating the liquid in a confluent channel at a proper temperature, fusion and coalescence after coagulation stopping can be efficiently carried out. Further, when heating is performed with a microwave applicator, a liquid can be heated in a very short time, and also the irradiated part can be heated evenly.

As the materials of reactors, any materials can be used so long as they do not cause problems at the time of feeding a liquid containing resin particle dispersion and a coagulation stopper, and at the time of fusion and coalescence. Materials such as metals, ceramics, glass, fused silica, silicone and synthetic resins are exemplified, and synthetic resins and fused silica are especially preferred of these materials.

As the synthetic resins, in view of mechanical shock resistance, heat resistance and chemical resistance, fluorine resins, polyester resins, styrene resins, acrylic resins, styrene-acrylic resins, silicone resins, epoxy resins, diene-based resins, phenolic resins, terpene resins, coumarin resins, amide resins, amideimide resins, butyral resins, urethane resins, ethylene-vinyl acetate resins are specifically exemplified. Fluorine resins are preferred of these resins for the reason of capable of preventing coagulated particles and colored resin particles from adhering to the inner wall of the channel.

As the fluorine resins, polytetrafluoroethylene (PTFE), tetrafluoroethylene-perfluoroalkyl vinyl ether copolymers (PFA), tetrafluoroethylene-hexafluoropropylene copolymers (FEP), tetrafluoroethylene-ethylene copolymers (ETFE), polyvinylidene fluoride (PVDF), and polychlorotrifluoroethylene (PCTFE), etc., are exemplified. Above all, tetrafluoroethylene-perfluoroalkyl vinyl ether copolymers (PFA) are preferred.

In the embodiment of the invention, channels whose insides are covered with a fluorine-based polymer material, polyimide resin, polyamide resin, or gold plate can also be preferably used.

Further, as the thermosetting resin, photo-curable resin and thermoplastic resin, the resins described in Kobunshi Daijiten (Polymer Dictionary), published by Maruzen Co., Ltd. (1994) can also be preferably used, according to necessity.

The size of reactors can be arbitrarily set according to use purpose.

Reactors may have parts having functions of separation, purification, analysis and cleaning according to use purpose.

It is preferred that reactors are provided with a feeding port to feed liquids to the first channel and the second channel, and a recovery port to recover the liquids from the reactors, if necessary.

According to necessity, a plurality of reactors may be combined, and a system can be constituted by combining apparatus having functions of separation, purification, analysis and cleaning, a feeding apparatus, a recovering apparatus, and other reactors.

In the invention, by combining a reactor for forming coagulated particles from resin particle dispersion and colorant particle dispersion and the reactor for use in the embodiment of the invention, a reactor capable of producing colored resin particles more excellent in particle size distribution and shape uniformity can be provided.

The manufacturing method of colored resin particles of the exemplary embodiment of the invention includes a process of feeding coagulated particle dispersion containing coagulated particles comprising at least resin particles and a colorant to the first channel.

It is preferred for the reactor used in the embodiment of the invention to be equipped with a control unit of the quantity of flow for varying the quantity of flow to be fed. The control unit of the quantity of flow is preferably provided on the feeding port side of the liquid rather than the outlet port side. As the control unit of the quantity of flow, a syringe pump, a gear pump, and a plunger pump are exemplified, and a syringe pump is preferably used.

The volume average particle size of the resin particles is preferably 0.01 to 1.5 µm, and more preferably 0.01 to 0.5 µm. When the volume average particle size is in the above range, the dispersion state of the resin particles in an aqueous medium is stabilized.

The manufacturing method of resin particles is not especially restricted and known methods can be used.

Specifically, resin particles manufactured by an emulsion polymerization method, a suspension polymerization method and a phase inversion emulsification method can be used, or resin particles can be obtained by mechanically cracking a resin obtained by a block polymerization method, or a resin obtained by an arbitrary polymerization method may be emulsification dispersed by mechanical shear or the like to obtain resin particles.

Coagulated particles can be obtained by coagulation with at least particles such as the resin particles and colorant particles as the materials and preferably using a coagulant.

As the coagulant, monovalent or higher charged compounds are preferred. As the specific examples of such compounds, water-soluble surfactants such as ionic surfactants and nonionic surfactants; acids such as hydrochloric acid, sulfuric acid, nitric acid, acetic acid and oxalic acid; metal salts of inorganic acids such as aluminum chloride, magnesium chloride, sodium chloride, aluminum sulfate, calcium sulfate, ammonium sulfate, aluminum nitrate, silver nitrate, copper sulfate, and sodium carbonate; metal salts of aliphatic acids and aromatic acids such as sodium acetate, potassium formate, sodium oxalate, sodium phthalate, and potassium salicylate; metal salts of phenols such as sodium phenolate; metal salts of amino acid; and inorganic acid salts of aliphatic and aromatic amines such as triethanolamine hydrochloride and aniline hydrochloride are exemplified. These coagulants can be used by one kind alone or two or more kinds in combination.

The liquid components of coagulated particle dispersion are not especially restricted so long as they are liquids that do not dissolve resin particles and do not hinder coagulation, but preferably they are liquids capable of dissolving coagulants, and more preferably the main component of the liquids is an aqueous medium.

As the aqueous media that can be used in the embodiment of the invention, for example, waters such as distilled water and ion exchange water, and alcohols such as ethanol and methanol are exemplified, and waters such as distilled water and ion exchange water are especially preferred. They may be used by one kind alone or two or more kinds may be used in combination.

The aqueous media may contain water-miscible organic solvents. As the water-miscible organic solvent, e.g., acetone is exemplified.

Further, the main component of the liquid components in the coagulated particle dispersion and the main component of the liquid components in the liquids containing a coagulation stopper are preferably the same liquid.

The coagulated particle dispersion in the manufacturing method of the coagulated resin particles in the embodiment of the invention may contain one kind of resin particles or may contain two or more kinds.

The solids content in the coagulated particle dispersion is preferably 5 to 50 wt %, and more preferably 10 to 40 wt %. When the solids content is in the above range, the coagulated particle dispersion has proper fluidity.

When the colored resin particles that can be obtained according to the manufacturing method of colored resin particles are used in the production of a toner for electrostatically charged image development, it is preferred for the coagulated particles to contain resin particles, a colorant and a releasing agent.

The manufacturing method of colored resin particles in the embodiment of the invention includes a process of feeding a liquid containing a coagulation stopper from the second channel and stopping coagulation growth of the coagulated particles.

In the embodiment of the invention, in the stage when the coagulated particles have reached a desired particle size by a coagulant, the coagulated particles are fed to the first channel as coagulated particle dispersion, and a liquid containing a coagulation stopper is fed from the second channel to stop coagulation, thus the coagulated particles can be regulated to a desired particle size.

As the coagulation stoppers that can be used in the embodiment of the invention, a pH adjustor, a surfactant and a metal salt are exemplified.

As the pH adjustor, for example, ordinarily used acids and alkalis, e.g., nitric acid, hydrochloric acid, sodium hydroxide, potassium hydroxide and ammonia can be used.

The pH at the confluent channel is preferably 5.0 to 7.5 in the state of converged two liquids being completely blended, and more preferably 5.5 to 7.0. In the above range of the pH, coagulation can be efficiently stopped, and colored resin particles having a uniform particle size and shape are obtained. In the embodiment of the invention, it is preferred to regulate the concentration of the liquid containing a coagulation stopper and flow rate so as to reach the pH of the above range.

Surfactants can also be used as coagulation stoppers.

As the surfactants, for example, anionic surfactants of sulfuric esters, sulfonic esters, phosphoric esters, and soaps; cationic surfactants of amine salts, and quaternary ammonium salts; and nonionic surfactants of polyethylene glycol, alkylphenol ethylene oxide adducts, and polyhydric alcohols are preferably exemplified. Of these surfactants, ionic surfactants are preferred, and anionic surfactants and cationic surfactants are more preferred. It is preferred to use these nonionic surfactants in combination with the anionic or cationic surfactants. These surfactants may be used by one kind alone or two or more in combination.

The specific examples of the anionic surfactants include fatty acid soaps such as potassium laurate, sodium oleate, and sodium castor oil; sulfates such as octyl sulfate, lauryl sulfate, lauryl ether sulfate, and nonylphenyl ether sulfate; sulfonates such as lauryl sulfonate, dodecyl sulfonate, dodecylbenzene sulfonate, triisopropylnaphthalene sulfonate, dibutylnaphthalene sulfonate, sodium alkylnaphthalene sulfonate, naphthalenesulfonate formalin condensate, monooctyl sulfosuccinate, dioctyl sulfosuccinate, lauric acid amide sulfonate, and oleic acid amide sulfonate; phosphates such as lauryl phosphate, isopropyl phosphate, and nonylphenyl ether phosphate; and sulfosuccinates such as sodium dialkyl sulfosuccinate such as dioctyl sulfosuccinate, disodium lauryl sulfosuccinate, and disodium lauryl polyoxyethylene sulfosuccinate. Of these anionic surfactants, dodecylbenzene sulfonate and branched products thereof such as alkylbenzene sulfonate compounds are preferred.

The specific examples of the cationic surfactants include amine salts such as laurylamine hydrochloride, stearylamine hydrochloride, oleylamine acetate, stearylamine acetate, and stearylaminopropylamine acetate; and quaternary ammonium salts such as lauryltrimethylammonium chloride, dilauryldimethylammonium chloride, distearylammonium chloride, distearyldimethylammonium chloride, lauryldihydroxyethylmethylammonium chloride, oleylbispolyoxyethylenemethylammonium chloride, lauroylaminopropyldimethylethylammonium ethosulfate, lauroylaminopropyldimethylhydroxyethylammonium perchlorate, alkylbenzenedimethylammonium chloride, and alkyltrimethylammonium chloride.

The specific examples of the nonionic surfactants include alkyl ethers such as polyoxyethylene octyl ether, polyoxyethylene lauryl ether, polyoxyethylene stearyl ether, and polyoxyethylene oleyl ether; alkylphenyl ethers such as polyoxyethylene octylphenyl ether, and polyoxyethylene nonylphenyl ether; alkyl esters such as polyoxyethylene laurate, polyoxyethylene stearate, and polyoxyethylene oleate; alkylamines such as polyoxyethylene lauryl aminoether, polyoxyethylene stearyl aminoether, polyoxyethylene oleyl aminoether, polyoxyethylene soybean aminoether, and polyoxyethylene beef tallow aminoether; alkylamides such as polyoxyethylene lauric acid amide, polyoxyethylene stearic acid amide, and polyoxyethylene oleic acid amide; vegetable oil ethers such as polyoxyethylene castor oil ether, and polyoxyethylene rapeseed oil ether; alkanolamides such as lauric acid diethanolamide, stearic acid diethanolamide, and oleic acid diethanolamide; and sorbitan ester ethers such as polyoxyethylene sorbitan monolaurate, polyoxyethylene sorbitan monopalmitate, polyoxyethylene sorbitan monostearate, and polyoxyethylene sorbitan monooleate.

As the metal salts, metal salts of monovalent to trivalent metals are preferably exemplified.

As the metal salts, ordinary inorganic metal compounds (inorganic metal salts) and polymers thereof are exemplified. The metal elements constituting the inorganic metal salts are divalent or higher charged metal elements belonging to groups 2A, 3A, 4A, 5A, 6A, 7A, 8, 1B, 2B and 3B of the Periodic Table (Long Periodic Table), and they are sufficient to be soluble in coagulated resin particles in the form of ions.

As the monovalent metal salts, salts of alkali metals such as sodium, potassium and lithium are exemplified. As the divalent metal salts, salts of alkaline earth metals such as calcium and magnesium, and metal salts of manganese and copper are exemplified. As the trivalent metal salts, metal salts of iron and aluminum are exemplified.

Describing in more detail, as the metal salts of monovalent metals, sodium hydroxide, potassium hydroxide, sodium chloride, potassium chloride, and lithium chloride are exemplified. As the metal salts of divalent metals, magnesium chloride, calcium chloride, calcium nitrate, zinc chloride, copper sulfate, magnesium sulfate, and manganese sulfate are exemplified. The trivalent metal salts include aluminum chloride and iron chloride.

In the embodiment of the invention, the monovalent metal salts are preferably used as the coagulation stoppers, and sodium hydroxide and sodium chloride are especially preferred of them.

When surfactants and metal salts are used as the coagulation stoppers, it is preferred to properly adjust concentration of a dissolved liquid and flow rate so as to swiftly exhibit the effect and not to exert a bad influence on the processes after that (shape control by fusion and coalescence, and especially cleaning process after granulation).

The manufacturing method of colored resin particles in the embodiment of the invention includes a process of heating the first confluent channel to coalesce the coagulated particles (fusion and coalescence process). The fusion and coalescence process is a process of heating the coagulated particles at the glass transition temperature or higher of the resin to form the coagulated particles to fuse and coalesce the coagulated particles. By the selection of heating temperature in the fusion and coalescence process, not only the invention can provide colored resin particles having desired average degree of circularity by the control of the toner shape from amorphous to spherical, but also the surface roughness of the colored resin particles can be regulated.

The heating temperature is preferably higher than the melting temperature or glass transition temperature of the resin contained in the coagulated particles by 20 to 100° C., and more preferably higher by 30 to 80° C.

Figure 3:
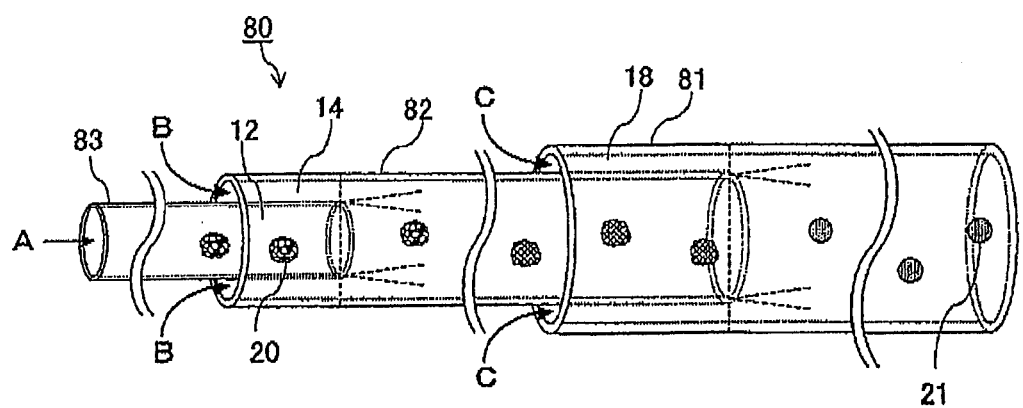
FIG. 3 is a typical drawing showing another exemplary example of a pipeline type reactor for use in the manufacturing method of the colored resin particles in the exemplary embodiment of the invention.

In the invention, as shown in FIG. 3, an exemplary embodiment such that the reactor 80 further has a second confluent channel where the first confluent channel and the third channel 18 converge, and includes a process of feeding a liquid containing a shape controlling agent from the third channel 18, and a process of heating the second confluent channel is also preferably exemplified.

As the shape controlling agents, the foregoing pH adjustor, surfactants and metal salts are exemplified.

When the shape controlling agents are used, there is a possibility that the uniformity of particle shape is damaged if the liquid containing the shape controlling agent is flowed in high concentration and swiftly, so that it is preferred to flow the shape controlling agent in low concentration and gradually and rapidly change the atmosphere.

The concentration of the shape controlling agent at the time of flowing is preferably 0.05 to 15 weight, although it depends upon the flowing rate, and more preferably 0.1 to 10 weight %. Shape control is easy in the above range of the concentration and preferred.

Further, in the embodiment of the invention, it is preferred to have a cooling process of cooling the fused and coalesced colored resin particles.

As the cooling method, a method of cooling with the temperature control unit equipped at the confluent channel, and a method of forming a channel to feed a cooling liquid such as water in the reactor are exemplified.

As the reactors that can be used in the manufacturing method of the colored resin particles in the invention, reactors shown below are specifically preferably exemplified.

FIG. 1 is a typical drawing showing an exemplary example of a pipeline type reactor for use in the manufacturing method of the colored resin particles in the invention.

Reactor 10 shown in FIG. 1 is a pipeline type reactor of multiple pipe structure in which a member forming the first channel (first channel-forming member 24) and a member forming the second channel (second channel-forming member 26) are arranged in a state of concentric circle.

First channel-forming member 24 forms first channel 12, and second channel-forming member 26 forms second channel 14 having a doughnut type cross sectional shape at outer circumference of the first channel. First channel-forming member 24 is a member having a length to the middle of second channel-forming member 26, and first confluent channel 16 is formed on the downstream from the tip of first channel-forming member 24.

To first channel 12 is fed coagulated particle dispersion A containing coagulated particles 20, and liquid B containing a coagulation stopper is fed to second channel 14.

Coagulated particle dispersion A and liquid B containing a coagulation stopper converge at first confluent channel 16, and diffuse gradually into each other in a boundary region preferably forming a laminar flow (diffusion part 22). Coagulation growth of coagulated particles 20 is stopped by the coagulation stopper at diffusion part 22.

Figure 2:
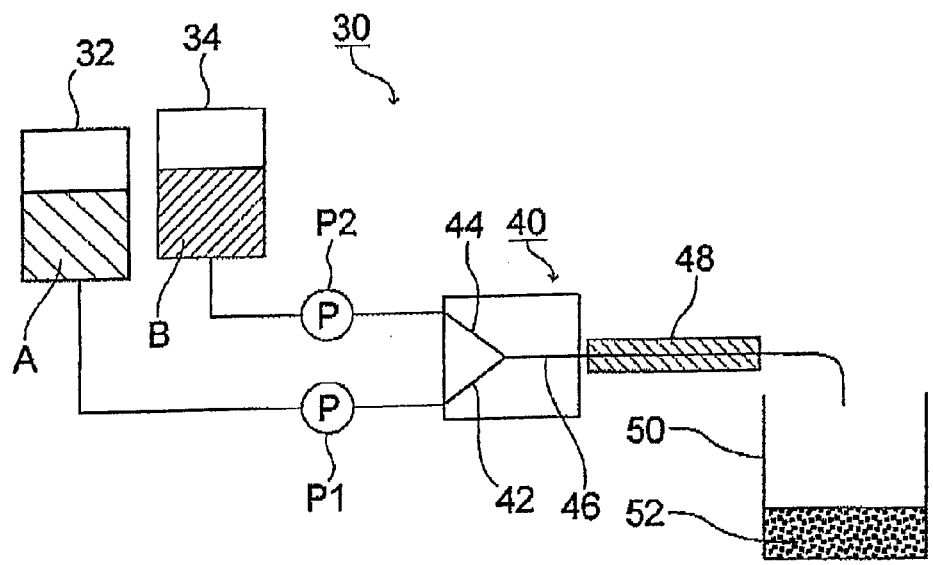
FIG. 2 is a typical cross sectional drawing showing another exemplary example of a reactor for use in the manufacturing method of the colored resin particles in the exemplary embodiment of the invention.

FIG. 2 is a typical cross sectional drawing showing another exemplary example of a reactor for use in the manufacturing method of the colored resin particles in the invention.

Apparatus 30 shown in FIG. 2 comprises two tanks 32 and 34, reactor 40, liquid-feeding pumps P1 and P2, heater 48, container 50, and channels of first channel 42, second channel 44, and first confluent channel 46.

Tank 32 holds coagulated particle dispersion A, and tank 34 holds liquid B containing a coagulation stopper.

Coagulated particle dispersion A in tank 32 and liquid B containing a coagulation stopper in tank 34 are fed to first channel 42 and second channel 44 via liquid-feeding pumps P1 and P2, respectively, and they converge at first confluent channel 46.

In first confluent channel 46, coagulation stop occurs. After the coagulated particles are fused and coalesced by heating by means of heater 48 equipped at first confluent channel 46, liquid containing colored resin particles 52 is obtained. Liquid containing colored resin particles 52 is recovered in container 50.

The temperature of heater 48 may be adjusted, if necessary, and may have other heating system and cooling system. The installing position of the apparatus for adjusting the temperature of heater 48 is not especially restricted, so long as heating is possible after coagulation stop. The apparatus may be installed at optional position on the confluent channel, for example, in reactor 40, or the whole of apparatus 30 or the whole of reactor 40 may be put in a temperature-controlled container.

Each channel of reactor 40 (first channel 42, second channel 44, first confluent channel 46) may be microscale channels.

Reactor 40 shown in FIG. 2 can be preferably manufactured on a solid substrate by fine processing techniques. The fine processing techniques are not especially restricted. For example, LIGA technique using X-rays, a method using a resist part as a structure by photolithography, further, a method of etching treatment of a resist aperture, micro-discharge processing, laser processing, and mechanical micro-cutting work using micro-tools made of a hard material such as diamond are exemplified. These techniques may be used alone, or may be used in combination.

The toner for electrostatically charged image development in the invention is bound to contain colored resin particles of the invention. Further, the colored resin particles of the invention can also be used as the colorant for inkjet recording ink. The colored resin particles of the invention can also be preferably used as the two-component electrostatically charged image developer containing the toner for electrostatically charged image development and a carrier.

EXAMPLE

The invention will be described more specifically with reference to examples, but the invention is by no means restricted thereto. In the examples "parts" means "weight part" and "%" means "wt %" unless otherwise indicated.

Preparation of Resin Particle Dispersion:

Preparation of Acryl Resin Particle Dispersion:

The following-shown oil phase 1, oil phase 2, aqueous phase 1 and aqueous phase 2 are prepared to be used in the preparation of acryl resin particle dispersion.

Oil Phase 1:

| | |
|---|---|
| Styrene (manufactured by Wako Pure Chemical Industries, Ltd.) | 15.3 parts |
| n-Butyl acrylate (manufactured by Wako Pure Chemical Industries, Ltd.) | 0.46 parts |
| β-Carboxyethyl acrylate (manufactured by Rhodia Nikka) | 0.6 parts |
| Dodecanethiol (manufactured by Wako Pure Chemical Industries, Ltd.) | 0.2 parts |

Oil Phase 2:

| | |
|---|---|
| Styrene (manufactured by Wako Pure Chemical Industries, Ltd.) | 15.3 parts |
| n-Butyl acrylate (manufactured by Wako Pure Chemical Industries, Ltd.) | 0.46 parts |
| β-Carboxyethyl acrylate (manufactured by Rhodia Nikka) | 0.6 parts |
| Dodecanethiol (manufactured by Wako Pure Chemical Industries, Ltd.) | 0.4 parts |
| Decanediol diacrylate (manufactured by Shin Nakamura Chemical Co., Ltd.) | 0.3 parts |

Aqueous Phase 1:

| | |
|---|---|
| Ion exchange water | 17.5 parts |
| Anionic surfactant (DOWFAX 2A1, manufactured by The Dow Chemical Company) | 0.35 parts |

Aqueous Phase 2

| | |
|---|---|
| Ion exchange water | 40 parts |
| Anionic surfactant (DOWFAX 2A1, manufactured by The Dow Chemical Company) | 0.05 parts |
| Ammonium persulfate (manufactured Wako Pure Chemical Industries, Ltd.) | 0.3 parts |

Preparation of Acryl Resin Particle Dispersion:

Oil phase 1 component and half an amount of aqueous phase 1 component are put in a flask (container 1) and stirred and mixed to obtain emulsion 1. Similarly, oil phase component 2 and the remaining half of aqueous phase 1 are put in another flask (container 2) and stirred and mixed to obtain emulsion 2.

Aqueous phase 2 component is put in a different flask (container 3), and container 3 is thoroughly substituted with nitrogen and the inside of container 3 is heated to 75° C. in an oil bath while stirring. In the next place, emulsion 1 in container 1 is gradually dripped into container 3 over 2 hours. After termination of dripping of emulsion 1, emulsion 2 in container 2 is gradually dripped into container 3 over 1 hour to perform emulsion polymerization.

After termination of dripping of emulsion 2, polymerization is further carried out in container 3 at 75° C. for 3 hours to obtain acrylic resin particle dispersion. Cumulative number average particle size $D_{50\,n}$ of the obtained acrylic resin particles measured with a laser diffraction type particle size distribution meter (LA-700, manufactured by Horiba, Ltd.) is 250 nm. The glass transition temperature of the resin particles measured with a differential scanning calorimeter (DSC-50, manufactured by Shimadzu Corporation) by temperature increasing rate of 10° C./min is 52° C. The number average molecular weight (polystyrene equivalent) measured by a molecular weight meter (HLC-8020, manufactured by Tosoh Corporation) with tetrahydrofuran (THF) as the solvent is 9.900.

Preparation of Polyester Resin Particle Dispersion:

Synthesis of Polyester Resin:

Into a heated and dried three-neck flask are added 15 parts of polyoxyethylene(2,0)-2,2-bis(4-hydroxyphenyl) propane, 85 parts of polyoxypropylene(2,2)-2,2-bis(4-hydroxyphenyl) propane, 55 parts of terephthalic acid, 25 parts of fumaric acid, 25 parts of n-dodecenyl succinic acid, and 0.05 parts of dibutyltin oxide based on the above acids (total parts of terephthalic acid, fumaric acid, and n-dodecenyl succinic acid). Nitrogen gas is introduced into the container and temperature is gradually raised while maintaining inert atmosphere. The mixture is subjected to co-condensation reaction at 140 to 240° C. for about 12 hours, and pressure is gradually reduced at 210 to 260° C. to synthesize a polyester resin. The weight average molecular weight (Mw) of the obtained polyester resin is 19,000 by measurement according to gel permeation chromatography (polystyrene equivalent). The glass transition point of the polyester resin on measurement by a differential scanning calorimeter (DSC) similar to the above does not show a clear peak, and stepwise endothermic change is observed. The glass transition point as the middle point of the stepwise endothermic change is 60° c.

Preparation of Polyester Resin Particle Dispersion:

| | |
|---|---|
| Polyester resin | 22 parts |
| Methyl ethyl ketone (manufactured by Wako Pure Chemical Industries, Ltd.) | 13 parts |
| 2-Propanol (manufactured by Wako Pure Chemical Industries, Ltd.) | 6 parts |

The above components are put in a pressure tight container for stirring and melted and stirred to swell and dissolve the resin part. After that, 0.5 parts of 10% aqueous ammonia (manufactured by Wako Pure Chemical Industries, Ltd.) is dripped thereto, and stirring is continued for a while as it is. Ion exchange water (58 parts) is then gradually dripped thereto with stirring the solution to perform phase inversion emulsification. Subsequently, methyl ethyl ketone and 2-propanol are distilled out of the resin solution under reduced pressure after phase inversion emulsification to obtain polyester resin particle dispersion. Further, as dispersion stabilizing auxiliary, 0.3 parts of anionic surfactant (DOWFAX 2A1, manufactured by The Dow Chemical Company) is put to the reaction solution to make polyester resin particle dispersion.

Preparation of Colorant Dispersion:

Cyan pigment (C. I. Pigment Blue 15:3) (60 parts), 5 parts of an anionic surfactant (Neogen R, manufactured by DAI-ICHI KOGYO SEIYAKU CO., LTD.), and 240 parts of ion exchange water are mixed, and the mixture is stirred with a homogenizer (ULTRA-TURRAX T50, manufactured by IKA) for 30 minutes, and then subjected to dispersion treatment with Ultimizer to obtain a colorant dispersion of a colorant having a volume average particle size of 215 nm (cyan pigment).

Preparation of Releasing Agent Dispersion:

Paraffin wax (HNP0190, melting point: 86° C., manufactured by NIPPON SEIRO CO., LTD.) (100 parts), 5 parts of anionic surfactant (Neogen SC, manufactured by DAI-ICHI KOGYO SEIYAKU CO., LTD.), and 240 parts of ion exchange water are dispersed in a round stainless steel flask with a homogenizer (ULTRA-TURRAX T50, manufactured by IKA) for 30 minutes, and then subjected to dispersion treatment in a pressure discharge type homogenizer to obtain releasing agent dispersion of releasing agent particles having a volume average particle size of 330 nm.

Preparation of Colored Resin Particles:

Liquid A containing coagulated particles, liquid B containing a coagulation stopper, and liquid C containing a shape controlling agent are prepared for use in the preparation of colored resin particles.

Preparation of Solution A Containing Coagulated Particles:

The following components are put in a in a round stainless steel flask and thoroughly mixed and dispersed with a homogenizer (ULTRA-TURRAX T50, manufactured by IKA).

| | |
|---|---|
| Acryl resin particle dispersion | 54.8 parts |
| Colorant dispersion | 8 parts |
| Releasing agent dispersion | 12 parts |
| Polyaluminum chloride (PAC100W, manufactured by Asada Chemical Industry Co., Ltd.) | 0.2 parts |

The components are stirred in the flask in a water bath for heating with gradually heating up to 48° C. while monitoring particle size growth by coagulation to thereby obtain coagulated particles of colored resin particles having an average particle size of 3 to 6 μm.

In the next place, 25 parts of acrylic resin particle dispersion are additionally added for surface covering of the obtained coagulated particles and stirred gently to obtain liquid A (acryl).

Similarly, liquid A (polyester) is obtained in the same manner by using polyester resin particle dispersion.

Preparation of Liquid B:

Liquid B: an aqueous solution containing an NaOH aqueous solution having the concentration as shown in Table 1 and an anionic surfactant (Tayca Power BN2060, manufactured by TAYCA CORPORATION) is prepared as an aqueous solution having normal concentration of a coagulation stopper.

Preparation of Liquid C:

Liquid C: an $HNO_3$ aqueous solution having the concentration as shown in Table 1 is prepared as an aqueous solution having normal concentration of a shape controlling agent.

Example 1

Manufacture of Colored Resin Particles 7 mm Diameter

Pipeline type reactor 80 shown in FIG. 3 is manufactured with the following tube and heater.

Large diameter tube 81 made of tetrafluoroethylene-perfluoroalkyl vinyl ether copolymer (PFA) having an inside diameter of 12 mm (Naflon tube, manufactured by NICHIAS CORPORATION), medium diameter tube 82 made of PFA having an outside diameter of 8 mm and inside diameter of 7 mm (Naflon tube, manufactured by NICHIAS CORPORATION), and small diameter tube 83 made of PFA having an outside diameter of 4 mm and inside diameter of 3 mm (Naflon tube, manufactured by NICHIAS CORPORATION) are prepared. Small diameter tube 83, medium diameter tube 82 and large diameter tube 81 are arranged in this order so that the cross sections of three PFA tubes form concentric circle.

A pipeline type reactor of multiple pipe structure 80 is manufactured by constructing the apparatus so that liquid A (acryl) can be fed to the small diameter tube, liquid B to the medium diameter tube and liquid C to the large diameter tube, respectively.

The length of small diameter tube 83 is 50 cm, and those of medium diameter tube 82 and large diameter tube 81 are about 2 m, and tubes are arranged by overlapping by 25 cm or so. A syringe pump is used as the feed pump (not shown in the figure). A heater is wound round medium diameter tube 82 at the downstream of about 1 m and the entire of large diameter tube 81 (not shown in the figure), and controlled to be capable of heating at about 50 to 95° C. The feed amount of liquid A is about 250 ml/h, liquid B is about 150 ml/h, and liquid C is about 250 ml/h.

As a result, a liquid containing colored resin particles 21 having equivalent circle diameter of 3.3 μm and average degree of circularity of 0.976 can be continuously obtained. The cumulative number frequency of particles which have degrees of circularity of less than 0.9 is 0.1%.

The obtained colored resin particle dispersion is sufficiently washed with ion exchange water after cooling and solid-liquid separated by Nutsche suction filtration. The dispersion is then again dispersed in ion exchange water at 40° C., and washed by stirring. After repeating the washing operation four times, the dispersion is subjected to solid-liquid separation by Nutsche suction filtration, dried in vacuum to obtain colored resin particles.

Measurements of Average Equivalent Circle Diameter A, Average Degree of Circularity B, Cumulative Number Frequency of Particles which have degrees of circularity of less than 0.9, and Variation Coefficient of Degree of Circularity:

Average equivalent circle diameter A, average degree of circularity B, cumulative number frequency of particles which have degrees of circularity of less than 0.9, and variation coefficient of degree of circularity are measured by a flow particle image analyzer FPIA-3000 (manufactured by Sysmex Corporation). The measuring condition is as follows.

Pretreatment: 300 mg of stock solution is diluted with 20 ml of pure water, and subjected to dispersion treatment by ultrasonic wave for 5 minutes.

Measuring Condition:
  Mode: HPF measurement mode
  Analyzing amount: 0.35 μL
  Counting of particles: 2,500 to 5,000 counts
Analyzing Condition:
  Range of the limit of particle size: 0.50 to 200.0 μm (equivalent circle diameter)
  Range of the limit of degree of circularity: 0.40 to 1.00
Evaluation of Degree of Coalescence:

The colored resin particles subjected to embedding treatment is sliced, and the degree of fusion and the presence of cavity of the inside of particles are judged by photographing with SEM. The results obtained are shown in Table 1 below.

Good: Fusion and coalescence of coagulated particles are appropriate. There are no boundaries among particles constituting coagulated particles, and inside cavity is not seen.

Medium: Fusion and coalescence of coagulated particles are not sufficient. Boundaries among particles constituting coagulated particles are partially confirmed, or inside cavity is observed on 10 number % of frequency or so.

Bad: Fusion and coalescence among particles constituting coagulated particles do not advance, and boundaries of coagulated particles can be confirmed, or inside cavity is observed on 50 number % of frequency or more.

Evaluation of Image Density Unevenness:

Colored resin particles are uniformly deposited on commercially available paper PPC (plain paper) in a size of 4 cm×3 cm in density of 3.5 g/m² to form a layer. The layer is subjected to fixing treatment with an apparatus capable of operating singly by using a fixing unit mounting on DCC-III4300 (manufactured by Fuji Xerox Co., Ltd.). The degree of unevenness of image density at the time of fixing treatment on the condition of 150° C., 130 mm/sec is judged. The results obtained are shown in Table 1.

Good: There is no partial mottle-like density difference in image and the image is a uniform fixing image.

Medium: Extremely slight or small partial density difference of image is seen, but mostly a uniform fixing image.

Bad: Density difference and mottles are seen all over the image and fixing image is not uniform.

Evaluation of Cleaning Property:

Colored resin particles are uniformly deposited on a glass plate in a size of 2 cm×3 cm in density of 4 g/m² to form a layer. The layer is wiped with a friction tester and a urethane rubber blade having a width of 15 mm and a thickness of 5 mm at an abutting angle of 20° and pressure of 2.5 gf/mm in one direction. The amount of the remaining colored particles after wiping is measured. The results obtained are shown in Table 1.

Good: The remaining colored particles cannot be visually confirmed, and the amount of residual deposition is 5 wt % or less.

Medium: The remaining colored particles can be visually confirmed in a thin layer state or streak-wise, and the amount of residual deposition is 5 to 30 wt %.

Bad: The remaining colored particle layer can be visually confirmed, and the amount of residual deposition is 30 wt % or more.

Incidentally, in Table 1, "Bad (crushed)" means that a part of the particles are crushed and a place where the crushed particles are adhered mottle-like or streak-wise can be seen.

Judgment:

The results of overall judgment are shown in Table 1. The criteria of judgment are as follows.

A: Very good
B: Good
C: Partly insufficient
D: Entirely insufficient

Example 2

Manufacture of Colored Resin Particles

530 μm Diameter

A pipeline type reactor shown in FIG. 3 is manufactured with the following tube and heater.

Large diameter tube 81 made of PFA having an inside diameter of 1.59 mm (Naflon tube, manufactured by NICHIAS CORPORATION), medium diameter tube 82 made having an outside diameter of 0.66 mm and inside diameter of 0.53 mm (Naflon tube, manufactured by NICHIAS CORPORATION), and small diameter tube 83 having an outside diameter of 0.35 mm and inside diameter of 0.25 mm of fused silica capillary tube (tube, manufactured by GL Science Inc.) are prepared. Small diameter tube 83, medium diameter tube 82 and large diameter tube 81 are arranged in this order so that the cross sections of three tubes form concentric circle.

A pipeline type reactor 80 of a micro-reactor is manufactured by constructing the apparatus so that liquid A (polyester) can be fed to the small diameter tube, liquid B to the medium diameter tube and liquid C to the large diameter tube, respectively.

The length of small diameter tube 83 is 5 cm, and those of medium diameter tube 82 and large diameter tube 81 are about 80 cm, and tubes are arranged by overlapping by 3 cm or so. A syringe pump (for example, PHD2000, manufactured by HARVARD) is used as the feed pump. A heater is wound round medium diameter tube 82 at the downstream of about 50 cm and large diameter tube 81 (not shown in the figure), and controlled to be capable of heating at about 50 to 95° C. The feed amount of liquid A is about 2 ml/h, liquid B is about 10 ml/h, and liquid C is about 25 ml/h. As a result, a liquid containing colored resin particles having equivalent circle diameter of 3.4 μm and average degree of circularity of 0.964 can be continuously obtained. The cumulative number frequency of particles which have degrees of circularity of less than 0.9 is 0.2%.

The obtained colored resin particle dispersion is sufficiently washed with ion exchange water after cooling and solid-liquid separated by Nutsche suction filtration. The dispersion is then again dispersed in ion exchange water at 40° C., and washed by stirring. After repeating the washing operation four times, the dispersion is subjected to solid-liquid separation by Nutsche suction filtration, dried in vacuum to obtain colored resin particles.

By using the obtained colored resin particles, degree of coalescence, image density unevenness, and cleaning property are evaluated in the same manner as in Example 1. The results of evaluation are shown in Table 1.

Example 3 and Comparative Example 2

Colored resin particles are manufactured in the same manner as in Example 2 except for using liquid A (acryl) as liquid A, and coalescence temperature, coagulation stopper and shape controlling agent as shown in Table 1, and degree of coalescence, image density unevenness, and cleaning property are evaluated in the same manner as in Example 2. The results of evaluation are shown in Table 1.

Example 4 and Comparative Example 1

Colored resin particles are manufactured in the same manner as in Example 1 except for using liquid A (polyester) as liquid A, and coalescence temperature, coagulation stopper and shape controlling agent as shown in Table 1, and degree of coalescence, image density unevenness, and cleaning property are evaluated in the same manner as in Example 1. The results of evaluation are shown in Table 1.

Comparative Example 3

Colored resin particles are manufactured in the same manner as in Example 2 except for using coalescence temperature, coagulation stopper and shape controlling agent as shown in Table 1, and degree of coalescence, image density unevenness, and cleaning property are evaluated in the same manner as in Example 2. The results of evaluation are shown in Table 1.

Comparative Example 4

Colored resin particles are manufactured in the same manner as in Example 1 except for using coalescence temperature, coagulation stopper and shape controlling agent as shown in Table 1, and degree of coalescence, image density unevenness, and cleaning property are evaluated in the same manner as in Example 1. The results of evaluation are shown in Table 1.

TABLE 1

| Example and Comparative Example | Tube Size (inside diameter) | | | Coalescence Temperature (° C.) | Liquid B Coagulation Stopper (concentration) | Liquid C Coagulation Stopper (concentration) |
|---|---|---|---|---|---|---|
| | Small Diameter Tube (mm) | Medium Diameter Tube (mm) | Large Diameter Tube (mm) | | | |
| Example 1 | 7 | 11 | 15 | 90 | NaOH (0.10N) | HNO$_3$ (0.30N) |
| Example 2 | 0.25 | 0.53 | 1.5 | 90 | Surfactant (0.50 wt %) | HNO$_3$ (0.05N) |
| Example 3 | 0.25 | 0.53 | 1.5 | 85 | NaOH (0.05N) | HNO$_3$ (0.02N) |
| Example 4 | 7 | 11 | 15 | 95 | NaOH (0.05N) | None |
| Comparative Example 1 | 7 | 11 | 15 | 90 | Surfactant (0.20 wt %) | HNO$_3$ (0.05N) |
| Comparative Example 2 | 0.25 | 0.53 | 1.5 | 95 | Surfactant (0.50 wt %) | HNO$_3$ (0.30N) |
| Comparative Example 3 | 0.25 | 0.53 | 1.5 | 85 | NaOH (0.10N) | HNO$_3$ (0.02N) |
| Comparative Example 4 | 7 | 11 | 15 | 85 | NaOH (0.01N) | None |

| Example and Comparative Example | Resin Particle Dispersion | Liquid A Average Equivalent Circle Diameter A (μm) | Expression (1) (0.990−0.0083A) | Expression (1) (1.021−0.0117A) | Average Degree of Circularity B | Cumulative Number Frequency of Particles which have Degrees of Circularity of Less Than 0.9 (%) | Coefficient of Variation |
|---|---|---|---|---|---|---|---|
| Example 1 | Acryl | 3.3 | 0.963 | 0.982 | 0.976 | 0.1 | 0.014 |
| Example 2 | Polyester | 3.4 | 0.962 | 0.981 | 0.964 | 0.2 | 0.011 |
| Example 3 | Acryl | 5.9 | 0.941 | 0.952 | 0.944 | 0.5 | 0.012 |
| Example 4 | Polyester | 4.9 | 0.949 | 0.964 | 0.963 | 0.8 | 0.016 |
| Comparative Example 1 | Polyester | 6.3 | 0.938 | 0.947 | 0.958 | 0.9 | 0.018 |
| Comparative Example 2 | Acryl | 3.1 | 0.964 | 0.985 | 0.99 | 1.1 | 0.018 |
| Comparative Example 3 | Polyester | 2.9 | 0.966 | 0.987 | 0.955 | 1.5 | 0.017 |
| Comparative Example 4 | Acryl | 5.8 | 0.942 | 0.953 | 0.937 | 1.2 | 0.020 |

| Example and Comparative Example | Degree of Coalescence | Image Density Unevenness | Cleaning | Judgment |
|---|---|---|---|---|
| Example 1 | Good | Medium | Medium | B |
| Example 2 | Medium | Medium | Medium | B |
| Example 3 | Medium | Medium | Good | A |
| Example 4 | Good | Medium | Good | A |
| Comparative Example 1 | Good | Bad | Medium | C |
| Comparative Example 2 | Good | Medium | Bad | D |
| Comparative Example 3 | Bad | Bad | Bad (crushed) | D |
| Comparative Example 4 | Bad | Bad | Bad (crushed) | D |

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A manufacturing method of colored resin particles, the method comprising:
    preparing a reactor that includes a first channel, a second channel, a first confluent channel where the first channel and the second channel converge and a temperature control unit that controls a temperature of the first confluent channel;
    feeding a coagulated particle dispersion containing coagulated particles that contain resin particles and a colorant to the first channel;
    stopping growth of coagulation of the coagulated particles by feeding a liquid containing a coagulation stopper from the second channel; and
    coalescing the coagulated particles by heating the first confluent channel.

2. The manufacturing method according to claim 1, wherein a laminar flow is formed at the first confluent channel at least in the stopping of the growth of coagulation.

3. The manufacturing method according to claim 1, wherein the coagulated particle dispersion is fed so as not to be in contact with an inner wall of the first confluent channel.

4. The manufacturing method according to claim 1, wherein a sheath flow is formed between an inner wall of the first confluent channel and a mixed solution of the coagulated particle dispersion and the liquid containing the coagulation stopper.

5. The manufacturing method according to claim 1, wherein an inner wall of the first channel and an inner wall of the first confluent channel are not continuously formed.

6. The manufacturing method according to claim 1, wherein a peripheral channel diameter of the first confluent channel is larger than a channel diameter of the first channel.

7. The manufacturing method according to claim 1, wherein a ratio of a quantity of flow of a liquid fed to the first channel and a quantity of flow of a liquid fed to the second channel is 1/0.3 to 1/100.

8. The manufacturing method according to claim 1, wherein the temperature control unit is a microwave applicator.

9. The manufacturing method according to claim 1, wherein the reactor further includes a control unit of quantity of flow that varies a quantity of flow to be fed.

10. The manufacturing method according to claim 9, wherein the control unit of quantity of flow is provided on a feeding port side of a liquid.

11. The manufacturing method according to claim 1, wherein a main component of liquid components in the coagulated particle dispersion and a main component of liquid components in the liquid containing the coagulation stopper are the same liquid.

12. The manufacturing method according to claim 1, further comprising:
    cooling the coalesced coagulated particles.

13. The manufacturing method according to claim 1, wherein the reactor further includes a third channel and a second confluent channel where the first confluent channel and the third channel converge, and
    the manufacturing method further comprises:
    feeding a liquid containing a shape controlling agent from the third channel; and
    heating the second confluent channel.

14. The manufacturing method according to claim 13, wherein the coagulated particle dispersion fed from the first channel and a liquid fed from at least one of the second channel and the third channel form a concentric circle flow with the coagulated particle dispersion as a center of the concentric circle flow.

15. The manufacturing method according to claim 13, wherein a ratio of a quantity of flow of a liquid fed to the first channel and a quantity of flow of a liquid fed to the third channel is 1/0.3 to 1/100.

* * * * *